B. SCHECHTER.
BRAKE HANDLE.
APPLICATION FILED OCT. 26, 1917.
1,261,857.
Patented Apr. 9, 1918.
2 SHEETS—SHEET 2.
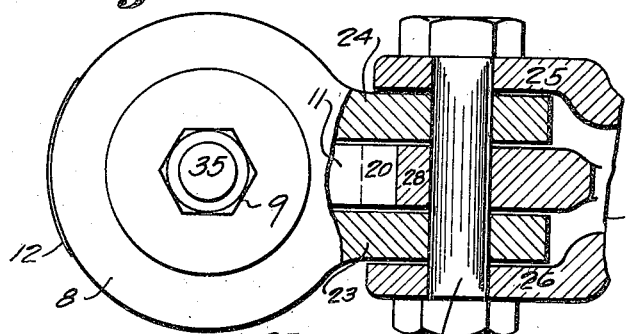
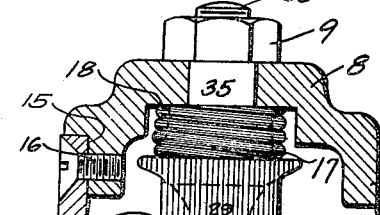
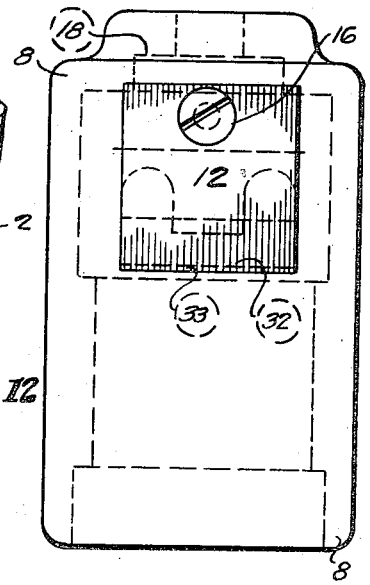
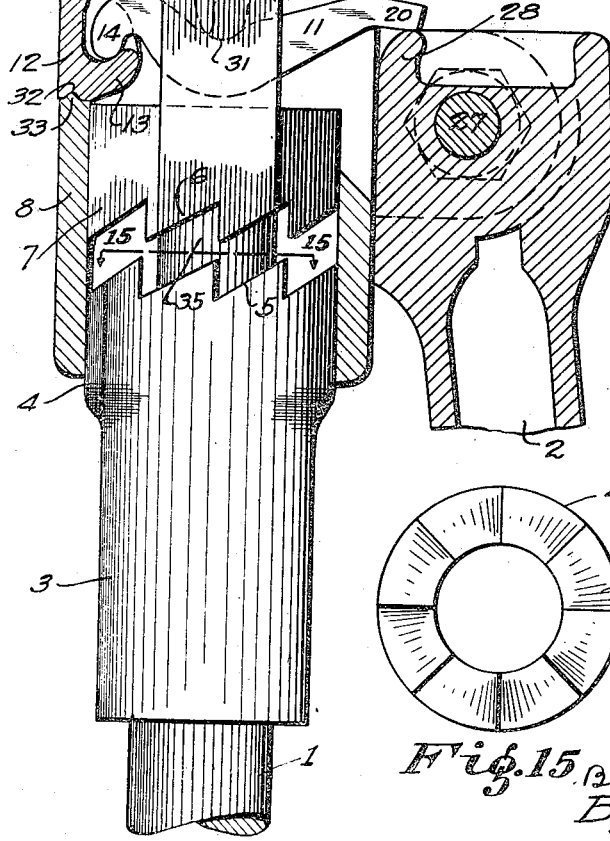
Inventor
Bernard Schechter
By Hugh K. Wagner,
Attorney.

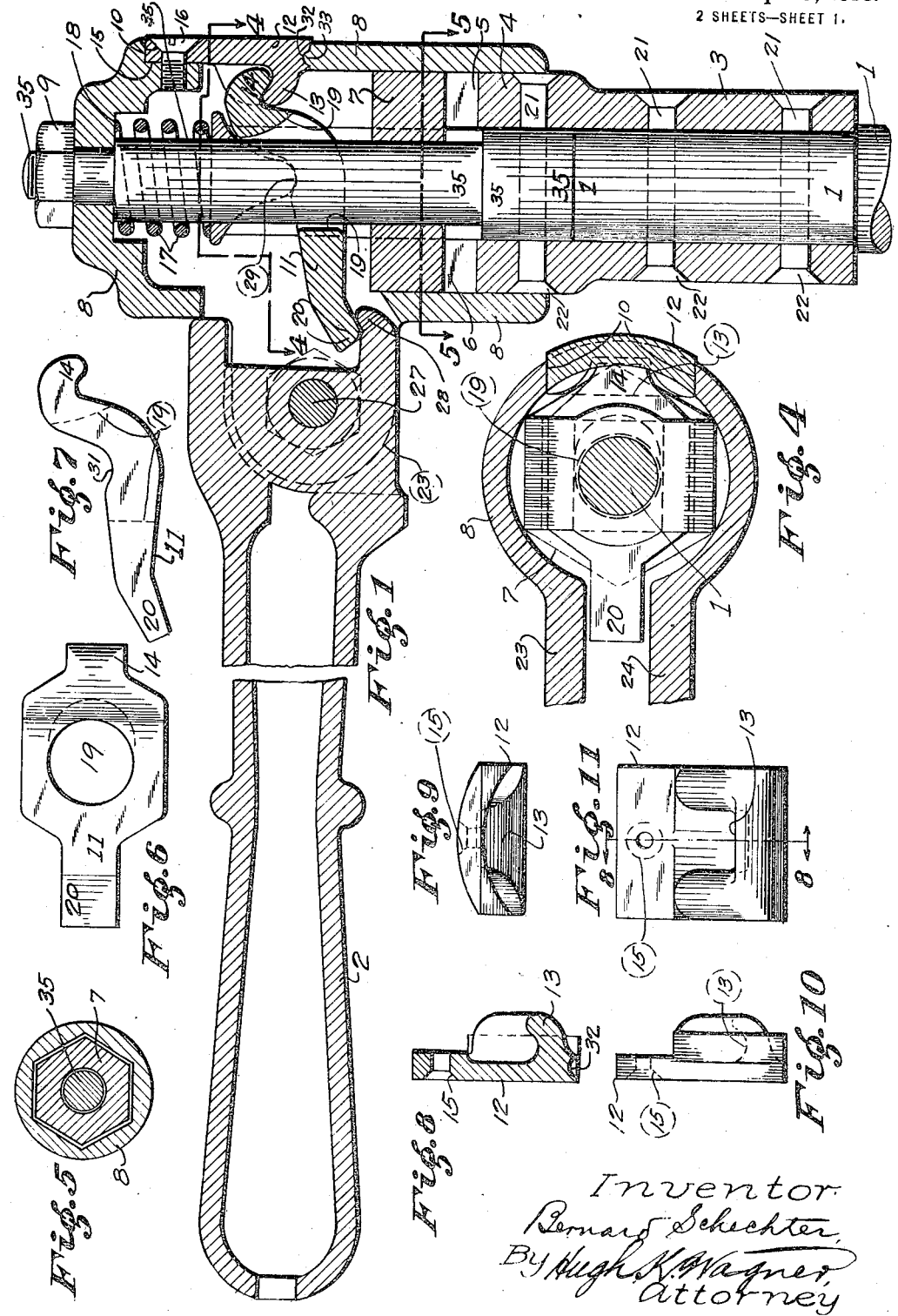

UNITED STATES PATENT OFFICE.

BERNARD SCHECHTER, OF ST. LOUIS, MISSOURI, ASSIGNOR OF ONE-HALF TO GEORGE H. TONTRUP, OF ST. LOUIS, MISSOURI.

BRAKE-HANDLE.

1,261,857.  Specification of Letters Patent.  Patented Apr. 9, 1918.

Application filed October 26, 1917. Serial No. 198,599.

*To all whom it may concern:*

Be it known that I, BERNARD SCHECHTER, a citizen of the United States, residing at St. Louis, in the State of Missouri, have invented certain new and useful Improvements in Brake-Handles, of which the following is a specification.

This invention consists of improvements in brake handles of the drop type, which require less room for their operation, and in which the ratchet means is engaged only during the use or operation of the brake. The dropping of the handle causes disengagement of one ratchet from the part that operates the brake.

In the accompanying drawings forming part of this specification, in which like numbers of reference denote like parts wherever they occur, Figure 1 is a sectional view showing the brake handle in raised, *i. e.*, operative position;

Fig. 2 is a sectional view showing the brake handle in lowered position;

Fig. 3 is a plan view partly in section;

Fig. 4 is a sectional view on the line 4—4 in Fig. 1, looking in the direction of the arrows;

Fig. 5 is a sectional view on the line 5—5 in Fig. 1, looking in the direction of the arrows;

Fig. 6 is a top plan view of the trigger;

Fig. 7 is a side elevation thereof;

Fig. 8 is a sectional view on the line 8—8 in Fig. 11, looking in the direction of the arrows;

Fig. 9 is a plan view of the anchor plate for the trigger;

Fig. 10 is a side elevation thereof;

Fig. 11 is a front elevation thereof;

Fig. 12 is a rear view of the body casing forming the housing for the head of the brake staff and connected parts;

Fig. 13 is a front elevation of the upper ratchet member;

Fig. 14 is a bottom plan of the upper ratchet member; and

Fig. 15 is a top plan view of the lower ratchet member.

The brake staff 1 passes through the floor of the car from its connection with the brake rigging (not shown in the drawings) and extends upwardly to the height suitable for the brake handle 2.

A ratchet bearing member 3 is enlarged at its upper end 4, on the upper edge of which is formed the lower ratchet 5. Upper ratchet 6 engages with ratchet 5 when the brake is being operated, *i. e.*, when handle 2 is in the raised position shown in Fig. 1.

Ratchet 6 is formed on the lower end of ratchet bearing member 7. Both ratchet bearing members 3 and 7 are hollow and the brake staff 1 passes partially through member 3 and its continuation member 35 extends above the top of member 7 and through the body casting or housing 8 which is fastened thereto by nut 9.

An aperture 10 in the wall of housing 8 allows the insertion therethrough and into the interior of the said housing of the dog or trigger 11, the said aperture being normally closed by the plate 12 having the lug 13 with which the nose 14 of dog 11 normally engages and by which the same is anchored. Plate 12 is fastened in counter-sink 15 by screw 16 and normally thus closes aperture 10 in housing 8.

Spring 17 abuts at 18 on the inside of the top of housing 8 and also against the top of ratchet bearing member 7 and tends to force ratchet 6 into engagement with ratchet 5 when the raising of handle 2 has removed interference therewith. When the handle 2 is down, as shown in Fig. 2, the action of the parts is to overcome the pressure of spring 17 by pressing thereagainst the ratchet bearing member 7, the same being thus held until handle 2 is again lowered.

The member 35 passes through hole 19 in trigger or dog 11 and clears the same even while the tail end 20 is being lifted or lowered by the movement of handle 2.

Staff 1 and member 35 are fixed to and within member 3 by the pins 21 having the upset ends 22, and therefore turn in unison with ratchet 5. Ratchet bearing member 7 is adapted to slide and otherwise move loosely on staff 1.

A pair of jaws 23 and 24 extending from the housing 8 between a pair of jaws 25 and 26 at the inner end of handle 2 are fastened within and to jaws 25 and 26 by bolt 27.

When the use of the brake has been finished, the handle 2 may be allowed to drop by gravity, and in so doing the tongue 28 formed integral with the handle 2 lifts underneath tail 20 of dog 11 and with the nose 14 of the dog 11 fulcruming on the lug 13, the said tongue 28 lifts the tail 20 in such manner that the dog 11 lifts on the noses 29 of lugs 30 which are formed integral with the upper ratchet bearing member 7, thereby raising the said upper ratchet 6 out of engagement with the lower ratchet 5. The slight recesses 31 in the top of dog 11 afford suitable engagement for the noses 29.

When plate 12 is to be inserted in the aperture 10 the groove 32 in the bottom edge of plate 12 is fitted over the bead 33 which holds the same temporarily while the plate is being fitted into counter-sink 15 and screw 16 being inserted and screwed home. The interior of the housing 8 is so shaped as to coöperate with the hexagonal part 34 of ratchet bearing member 7 so as to cause ratchet member 7 to rotate with the circumferential movement of handle 2, while the part of housing 8 that overlaps the lower ratchet bearing member 3 rotates or slides around the same, the lower ratchet member 3 being round or cylindrical while the upper one is polygonal in shape.

While the spring 17 is convenient to keep the upper ratchet member spring pressed when not disengaged by the positive action accompanying the lowering of handle 2, yet the said spring may be dispensed with and the action of the parts being produced merely by the movement of the handle.

Having thus described this invention, I hereby reserve the benefit of all changes in form, arrangement, order, or use of parts, as it is evident that many minor changes may be made therein without departing from the spirit of this invention, or the scope of the following claims.

Claims:

1. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog.

2. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue.

3. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue, and the said upper ratchet member being spring-pressed.

4. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue, and the said upper ratchet member being spring-pressed by a spring engaging the same and the inside upper part of the said housing.

5. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue, the said upper ratchet member being spring-pressed by a spring engaging the same and the inside upper part of the said housing, the said brake staff extending through the said housing, and means for fastening the said housing to its end.

6. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue, the said upper ratchet member being spring-pressed by a spring engaging the same and the inside upper part of the said housing, the said brake staff extending through the said housing, and means for fastening the said housing to its end, the said spring being adapted to maintain the ratchets in engagement when the said brake handle is elevated.

7. The combination of a brake staff, a housing mounted thereon, a brake handle having a tongue, the said housing having an opening, a dog located within the said housing, a plate adapted to close the said opening and having a lug, a ratchet member adapted to rotate with the said brake staff, another ratchet member adapted to coöperate with the first mentioned ratchet, the second mentioned ratchet member being angular in cross section and adapted to be rotated by the said handle and having lugs thereon adapted to be actuated by the said dog, the said dog being fulcrumed on the said lug and adapted to be actuated by the said tongue, the said upper ratchet member being spring-pressed by a spring engaging the same and the inside upper part of the said housing, the said brake staff extending through the said housing, and means for fastening the said housing to its end, the said spring being adapted to maintain the ratchets in engagement when the said brake handle is elevated, and the said brake handle being adapted to maintain the said ratchets in disengagement when the same is lowered.

In testimony whereof I hereunto affix my signature.

BERNARD SCHECHTER.

Copies of this patent may be obtained for five cents each, by addressing the "Commissioner of Patents, Washington, D. C."